Aug. 13, 1968  R. M. TUCK  3,396,606
POWER TRANSMISSION
Filed Dec. 28, 1965  2 Sheets-Sheet 1
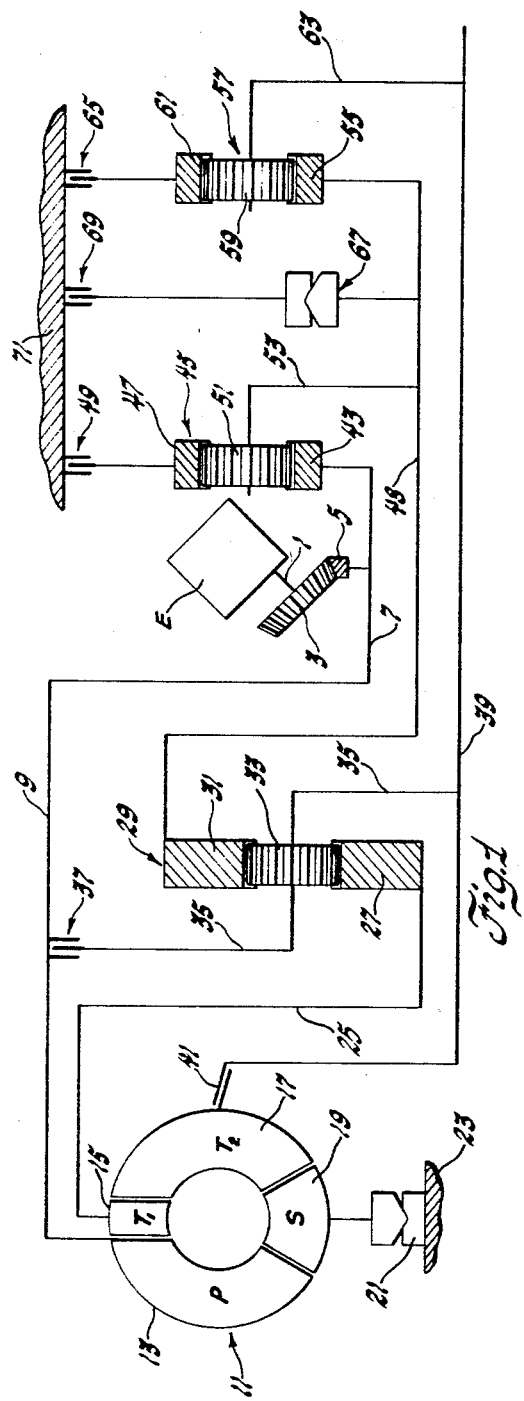
INVENTOR.
Robert M. Tuck
BY
Charles R. White
ATTORNEY United States Patent Office 3,396,606
Patented Aug. 13, 1968

3,396,606
POWER TRANSMISSION
Robert M. Tuck, Indianapolis, Ind., assignor to General Motors Corporation, Detroit, Mich., a corporation of Delaware
Filed Dec. 28, 1965, Ser. No. 516,996
13 Claims. (Cl. 74—677)

ABSTRACT OF THE DISCLOSURE

A transmission having a torque converter and a torque splitting planetary gearset driven by an engine to provide hydraulic and mechanical power paths which are combined by a torque combining planetary gearset for producing a split torque drive used for normal vehicle operation. A full converter low range drive is established by deactivating the torque splitting gearset and conditioning the torque combining gearset for torque multiplication so that the converter can drive the transmission output. A lock-up clutch is utilized to connect the torque converter input to the transmission output shaft to provide a direct mechanical drive. This transmission also includes a planetary gearset operatively connected to the converter and the transmission output for producing a reverse drive ratio.

---

Figure 3:
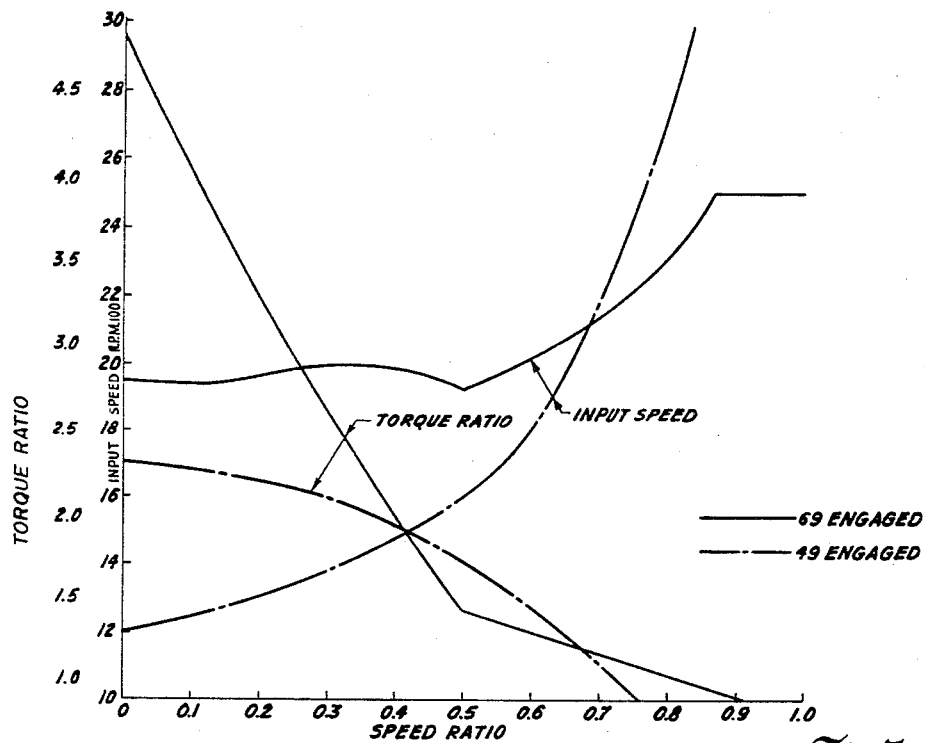

This invention relates to transmissions, and particularly to improved hydrodynamic torque converter transmissions, having a full converter underdrive for maximum performance, a split power underdrive for normal vehicle operation, and a full mechanical direct drive.

It is generally the practice to operate the engines of buses, trucks, etc. at relatively high speeds in order to produce adequate input power into a multi-ratio transmission to meet all vehicle operating requirements. These requirements range from large torque ratios for powerful acceleration, required for quick starts and for ascending steep grades, to a 1:1 torque ratio for direct drive. Torque requirements for normal operation of city buses, making frequent stops and utilizing underdrives, are generally not high; a torque ratio of 1.76 for example is adequate. Larger torque ratios are used only for fast starts and climbing steep grades. However, the engines, due to their high operating speeds, produce a high level of engine noises during all speed ratios. The present invention substantially reduces these engine noise levels, thus improving passenger and driver comfort.

In addition to the relatively high noise level produced, prior transmissions generally utilized range gearing, controlled by brakes and clutches engageable during operation, for providing stepped reduction drive ratios to accelerate the vehicle to a speed in which the vehicle can be powered directly by the engine in a direct drive ratio. The frictional wear and tear of these brakes and clutches is aggravated, since the cooperating frictional surfaces often have substantial movement relative to each other when engagement is being made.

The transmission of this invention employs a torque converter, which is matched with the engine to absorb the full engine torque, and includes means for splitting the input torque, so that the converter torque absorption capacity is much greater than the portion of the input torque delivered to the torque converter during split torque drive. The converter then drags on the engine and decreases engine working speed. This engine speed reduction results in a low engine noise level which meets higher standards for noise reduction.

This invention further employs a forward-drive one-way brake which is effective to hold the ring gear of a torque-combining gear set for reaction. This torque combining gear set has an input coupled to a turbine of the torque converter and an output coupled to a transmission output. A torque splitting planetary gear set is utilized to split input torques and to provide a mechanical drive into the ring gear of the torque-combining gear set for split torque low range drives.

In a preferred embodiment of the invention, a dual turbine torque converter is utilized in which the first turbine is connected to the sun gear of the torque combining gear set and a second turbine is clutched directly to the transmission output. Another embodiment of the invention includes a three-element torque converter in which the single turbine is coupled to the sun gear of the torque-combining planetary gear set, as is the first turbine of the dual turbine torque converter in the preferred embodiment. The two embodiments of the invention further include a third planetary gear set, which is conditionable to produce reverse range drives. Neutral is also provided in the embodiments by release of all the friction-drive establishing devices. In addition to providing for a lowering of engine input speeds into the torque converter, resulting in noise levels, wear on the friction-drive establishing devices of the transmission of this invention is substantially reduced, providing for long service with minimum maintenance, since only a portion of input torque is applied to the frictional surfaces.

It is an object of this invention to provide a new and improved torque converter transmission.

Another object of this invention is to provide a new and improved torque converter transmission, having a split torque underdrive, in which the input to the converter is reduced and the converter acts to reduce engine working speeds, thereby reducing engine and drive line noise levels.

Another object of this invention is to provide a torque converter transmission having a full converter underdrive for maximum torque multiplication, a split torque underdrive for normal vehicle operation in which the converter drags engine working speed to a lower input level for reduction of noise levels, and a direct drive lock-up.

These and other objects, features, and advantages will be apparent from the following detailed description and drawing.

Figure 4:
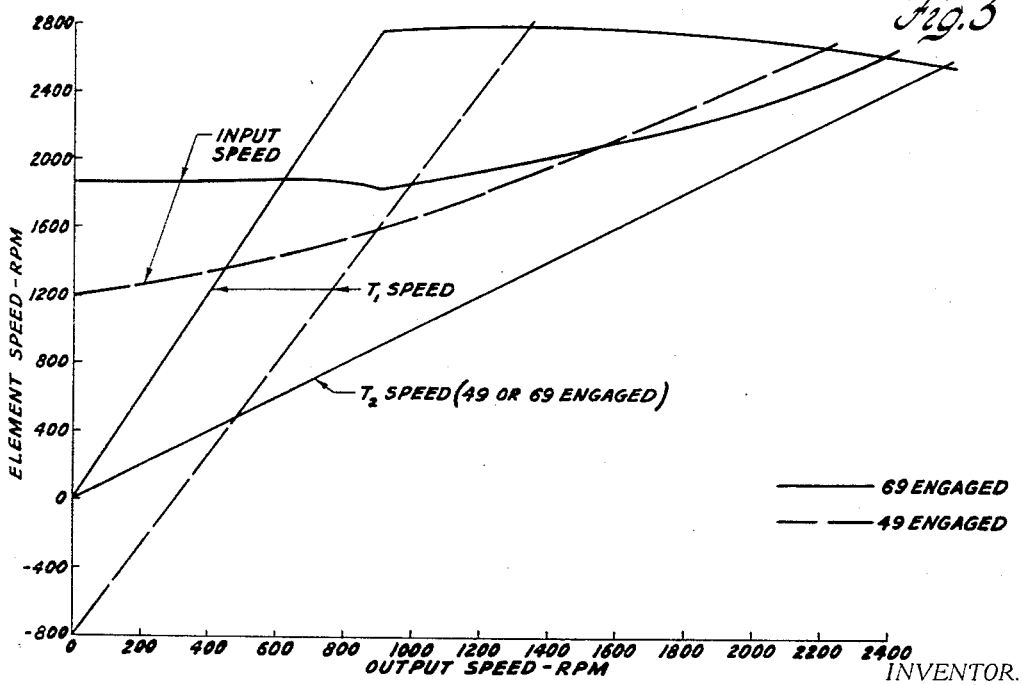

In the drawing, FIGURE 1 discloses a diagrammatic view of an upper portion of a preferred embodiment of this invention. FIGURE 2 is similar to that of FIGURE 1 showing another embodiment of the invention. FIGURES 3 and 4 are curves which illustrate operation of the converter shown in FIGURE 1.

The preferred embodiment of this transmission is illustrated in FIGURE 1, which shows the engine E connected to drive angle drive unit 1, including bevel gears 3 and 5 centrally located in the transmission for driving the sleeve shaft 7. The shaft 7 is connected to drive the housing 9, of the dual turbine hydrodynamic torque converter 11, which is matched with the engine to absorb full engine torque. The housing is operatively connected to drive the pump 13, which circulates working fluid around the converter torus sequentially to first turbine 15 or $T_1$; second turbine 17 or $T_2$; and stator 19, which returns fluid back into the pump. The stator can freewheel forwardly in one phase of converter operation; but is held in another phase of operation from reverse rotation by virtue of the one-way brake 21, which is connected to the ground sleeve 23. The first turbine 15 is connected by drive disc 25 to the sun gear 27 of a first planetary gear set 29. This gear set includes ring gear 31 and planets 33. A carrier 35 rotatably supports the planetary gears as shown. The planet carrier extends outwardly to the inner periphery of the housing 9 so that the carrier may be clutched directly to the rotatable housing 9 by application of the clutch 37, for direct drive of the carrier, as will appear below. The carrier is coupled to the drive output shaft 39 which forms the transmission output. The second turbine 17 of the converter may be connected to output shaft 39 by engagement of a selectively engageable clutch 41. In this regard, it will be noted that when clutch 41 is engaged, the first turbine is geared to the second turbine through the planetary gear set 29 and is not free to float.

As shown, the driven sleeve shaft 7 extends rearwardly to drive the sun gear 43 of a second planetary gear set 45. This gear set has a ring gear 47, which may be retarded from rotation by application of a selectively engageable friction-drive establishing device 49. Planets 51 are provided to mesh with the sun gear 43 and ring gear 47 and are rotatably supported in carrier 53, which is connected into the ring gear 31 of the first planetary gear set, while the other end is connected to the sun gear 55 of a reverse planetary gear set 57. This latter gear set includes planets 59, ring gear 61, and a carrier 63 for the planets. The ring gear may be appropriately retarded from rotation by application of friction-drive-establishing device 65. As illustrated, a one-way brake 67 is connected to the sleeve shaft 48. The one-way brake may be coupled to ground provided by the transmission case 71, by application of friction-drive-establishing device 69, to prevent the reverse rotation of the shaft 48 and the ring gear 31 of the torque-combining planetary gear set 29.

This improved transmission is particularly useful in vehicles, such as city buses, which make frequent stops and starts and require only moderate torque ratios for normal low range operation. To establish this drive range, which is employed in the largest percentage of city bus operation, the friction-drive-establishing devices 41, 49, and 69 are applied.

Power from the engine E is delivered into the transmission by the angle drive unit 1. When the friction device 49 is engaged, input power is split according to the ratio of the planetary gear set 45. This splitting of input power allows the converter to reduce engine speed and resulting noise levels. With the split in input power, both pump 13 of the converter and sun gear 43 of the gear set 45 are driven forwardly. With ring gear 47 of the torque splitting gear set retarded from rotation, carrier 53 is driven in a reduction ratio and shaft 48 is thereby driven. By this means, ring gear 31 is driven forwardly, providing a mechanical input into the torque combining gear set 29. Since the output drive shaft 39 is initially stationary with the vehicle, the carrier 35 is also stationary. With the carrier 35 stationary and ring gear 31 driven forwardly, the sun gear 27 and the connected first turbine 15 will be driven in a reverse direction. However the first turbine 15, by virtue of the fluid flow from the pump, will exert a positive torque on the sun gear 27. In this normally used drive range, the second turbine 17 is coupled to the initially stationary output shaft 39 through application of clutch 41. The second turbine exerts a small negative torque on the output shaft 39, since the working fluid exerting from the first turbine initially tends to turn the second turbine in a direction opposite to pump rotation.

FIGURE 4 shows the speed curves for the first and second turbines. The first turbine initially rotates in a reverse or negative direction, slowing down to zero speed at low transmission output speeds, and then rotates in a positive direction with increased speeds as output increases. The second turbine rotates in a positive direction, with speeds which gradually increase as output speeds increase. The torque ratio curve, with friction device 49 engaged, is shown in FIGURE 3 and illustrates the moderate torque ratios produced for normally used drive operations.

The planetary gear set 29, with friction device 49 on, combines the mechanical torque from the mechanical drive and the hydraulic torques from the torque converter turbines. It will be understood that the ring gear 31 has initially a large, positive, mechanical torque; and the sun gear 27 has initially a correspondingly smaller positive, hydraulic torque. The torque combining gear set combines these torques to drive the vehicle forwardly as the inertia of the vehicle is overcome. The combined positive torques overpower the initially small negative torque on clutch 41 to drive it forward as the vehicle is driven forward. First turbine torque gradually decreases to zero at about .7 speed ratio, as the second turbine torque gradually increases. At coupling, the vehicle is traveling at a speed in which input torque is sufficient to operate the vehicle in a direct drive. This direct, full mechanical drive is accomplished by applying friction device 37 and releasing friction device 49.

From the above, it will be seen that application of the friction device 49 splits input power into two paths by bringing on the torque splitting planetary gear unit. With less input to the converter, the capacity of the converter to drag the input speed down is increased. This leads to a reduction in vehicle engine speeds and the desirable result of lowering the noise level of the engine, thus contributing to the comfort of passengers and vehicle operators.

If greater torque, such as that used to go up steep grades, is necessary for operating the vehicle, the one-way brake 67 will engage as device 49 is released since friction device 69 may be engaged in all forward operation. Since input torque will not be split as in normal low range operation, there will be input only to the converter 11. In this high-torque-multiplication, low-range drive, the first turbine at stall will provide high-torque-multiplication, which gradually diminishes to zero at intermediate speed ratios, while the second turbine torque gradually increases from zero at stall to a maximum at intermediate speed ratios.

In the torque combining gear set, the sun gear 27 will be driven in a positive direction by the first turbine. The ring gear 31 is held from reverse rotation by one-way brake 67. This gear set multiplies first turbine torque according to its ratio, and combines the torques of the two turbines to produce the torque ratio curve illustrated in FIGURE 3. Since the converter and engine are matched and the input power is not split as in normal low, the input speeds remain fairly constant up to about .5 speed ratio from which point it gradually increases to its maximum speed.

Comparing the torque ratio curve in FIGURE 3, it will be seen that the high-torque ratio, with device 69 engaged and device 49 released, is initially much greater than the normal low-torque ratio. However, engine speeds are higher, as indicated by the input curves; and engine noise level is accordingly higher.

Reverse is established by application of the friction drive device 65, the sun gear 55 of the reverse planetary set is driven by the first turbine 15, and engagement of clutch 41 is optional. The carrier 35 is held by output shaft 39. Since the ring gear 31 will be driven in a reverse direction, the connected sun gear 55 will be driven in this same direction. The planets 59 will walk in the reverse planetary ring gear to turn the carrier 63 and the connected output shaft 39 in a reverse direction.

If the normal low range drive produced with device 49 engaged is insufficient to meet normal operating requirements, this device is simply released and the one-way brake 67 automatically functions to prevent reverse rotation of the ring gear of the torque combining gear set to condition the transmission for higher ratio underdrive. In direct drive, since the output shaft 39 will be moving at a speed which approaches the speed of housing 9, there is little relative motion between the friction surfaces of device 37 as it is engaged for direct drive.

Turning now to FIGURE 2, there is illustrated a second embodiment of the invention. This embodiment is similar to the previous embodiment but employs a three-element converter instead of a dual turbine converter, varies in the torque-splitting planetary gear set connections, and eliminates the clutch or friction device 41.

As shown, this embodiment has an engine-driven angle input unit 100 including bevel gears 103 and 105 which drives the sleeve shaft 107, the housing 109 of converter 110, and the connected converter pump 113. The converter includes single turbine 115 and a stator 119 which is connected to the ground sleeve 123 by one-way device 121. The turbine is coupled to the sun gear 127 of the torque combining gear set 129 which includes ring gear 131, planets 133, and a planet carrier 135. The planet carrier may be clutched to the rotating housing 109 by engagement of direct drive friction device 137. This carrier is also coupled to the transmission output shaft 139.

The sleeve shaft 107 is also connected to drive the ring gear 147 of the torque-splitting planetary gear set 145. This gear set has sun gear 143, which may be held for reaction by application of friction device 149 and planets 151 which are rotatably mounted on carrier 153. The carrier is connected to the sleeve shaft 148 which is connected to the ring gear 131 of the torque combining gear set 129 at one end. The other end of sleeve shaft 148 is connected to the sun gear 155 of the reverse planetary gear set 157. This gear set also includes ring gear 161, which may be retarded from rotation by application of friction-drive-establishing device 165, and the carrier 163 for planets 159. The carrier is coupled to the output shaft 139. A one-way device 167 is connected to the shaft 148, and may be grounded to the housing 171 by application of the friction device 169 to prevent reverse rotation of shaft 148 and the ring gear 131 of the torque combining planetary gear set.

In operation, the second embodiment is quite similar to that of the first embodiment. For normal low, split-power drives, the friction device 149 is engaged and the input torque is split by the planetary gear set 145. Since in this embodiment the sun gear is held and the ring gear is driven, the output of the carrier will have a reduced ratio, as compared to the torque-splitting planetary 45 of the first embodiment.

Due to the fact that the output shaft 139 holds carrier 135, the forwardly driven ring gear 131 will drive sun gear 127 and the converter turbine initially in a reverse direction. However, this turbine will exert a positive torque on the sun gear. In operation, the positive torque on the sun gear plus the torque on the ring gear 131, combined by the planetary gear set, are sufficient to move the vehicle forward in a reduction gear ratio, for example 1.3. This is suitable for normal requirements to operate the vehicle on level streets and on slight grades. The turbine in this embodiment will slow down to zero and rotate in a forward direction, as the first turbine 15 in the first embodiment. Due to the fact that the torque converter in this drive range lowers the engine speeds, the engine and drive line noise levels are substantially reduced. As in the previous embodiment, an efficient high speed range is provided by the direct coupling of the input to the output shaft by application of the direct clutch 137. High-torque ratio low-range drives, if needed, are provided by the application of clutch 169 to allow the one-way brake 167 to hold the ring gear 131 from reverse rotation. All power is through the converter and turbine 15 exerts positive torque on the sun gear 127, and a reduction gear ratio of 2.8 to 3.0, for example, may be obtained. As in the first embodiment, reverse is obtained through application of friction device 164, and there is full converter drive through the gear set 129 to the sun gear 155 of the reverse planetary gear set. Since ring gear 161 is held for reaction and the sun gear 155 is driven in a direction, the reverse planetary carrier 163 and the output shaft 139 will be driven in a reverse direction.

With both embodiments, the use of the new split-torque drive range provides for lower engine speeds and more efficient drive during operation of the vehicle in traffic in medium speeds. The proportion of hydraulic and mechanical drive in this drive range varies in accordance with the converter characteristics. Assuming a 1:1 speed ratio and with the planetary ring gears twice the diameter of the sun gears, a 60 percent mechanical and 40 percent hydraulic drive is obtained in the second embodiment.

It will be, of course, appreciated that the gear sets of the two embodiments specifically described may be interchangeable to meet specific requirements if desired. Other changes and modifications may be made to the hydrodynamic torque converter transmission described above which are within the spirit of this invention. Therefore, it is to be understood that this invention is not to be limited by the particular physical arrangements presented, but only by the scope of the claims which follow.

I claim:

1. In a transmission for a vehicle, the combination including a power plant operable at upper and lower speed power levels, transmission input and output means, torque transmitting means for connecting said input means to said power plant, hydrodynamic torque multiplying means operatively connected to said input means and having a capacity to absorb the full power output of said power plant, torque splitting gear means operatively connected to said transmission input means, first selectively engageable friction means operatively connected to said torque splitting gear means and selectively engageable with said torque splitting gear means for torque transmittal and to divert a portion of input power away from said hydrodynamic torque multiplying means and permit said hydrodynamic torque multiplying means to reduce the operating level of said power plant from the upper to the lower operating speed and thereby reduce the noise level of said power plant, and torque combining means operatively connected to said hydrodynamic torque multiplying means and said torque splitting means and said transmission output to combine the torques transmitted by said torque transmitting means and said hydrodynamic torque multiplying means for driving said transmission output means, second selectively engageable friction means engageable to connect said transmission input and output means for providing an all-mechanical drive and third friction means operatively connected to said torque combining means and engageable in response to release of said first selectively engageable friction means to condition said torque combining means for torque multiplication and said transmission for an all hydraulic drive.

2. The transmission of claim 1, said torque multiplying means being a dual turbine torque converter, said torque splitting means being a planetary gear set, said gear set having an input member and an output member and a control member said first friction means being a friction-drive-establishing device selectively engageable to retard rotation of said control member, means connecting said transmission input means to the pump of said torque converter, said torque combining means being a planetary gear set having a ring gear and a sun gear and planet gears and a carrier for said planet gears, said carrier being connected to the transmission output means, means connecting one of said turbines to one of said gears of said torque combining gear set, selectively engageable frictions means to operatively couple the other of said turbines to said carrier, said first mentioned selectively engageable friction means being operative to connect said carrier to said transmission input means, said third friction means being a one-way brake, means connecting said one-way brake and the output of said first planetary gear set to another of said gears of said torque combining gear set, a selectively engageable friction-drive-establishing device for grounding said one-way brake, said one-way brake when engaged and when said first mention friction-drive-establishing device is released, holding said last mentioned gear of said torque combining gear set for reaction, said torque splitting gear set when said first recited friction-drive-establishing device is engaged being operative to split input torque and establish a power path separate from the power path through said converter, said torque combining gear set operating to combine the power through the paths and to drive said output at a reduction ratio, said converter having a torque absorption capacity which drags the powerplant speed to a lower level when said input torque is split to thereby reduce powerplant and transmission noise levels.

3. The transmission of claim 1, said torque multiplying means being a single turbine torque converter, said torque splitting means being a planetary gear set, said gear set having an input member and an output member and a control member, said first friction means being a friction-drive-establishing device selectively engageable to retard rotation of said control member, means connecting said transmission input means to the pump of said torque converter, said torque combining means being a planetary gear set having a ring gear and a sun gear and planet gears and a carrier for said planet gears, said carrier being connected to the transmission output means, means connecting said turbine to one of said gears of said torque combining gear set, said second mentioned selectively engageable friction means being engageable to connect said carrier to said transmission input means, said third friction means being a one-way brake, means connecting said one-way brake and the output of said first planetary gear set to another of said gears of said torque combining gear set, a selectively engageable friction-drive-establishing device for grounding said one-way brake, said one-way brake when engaged and when said first mentioned friction-drive-establishing device is released holding said last mentioned gear of said torque combining gear set for reaction to establish a reduction ratio in the transmission and a power path through said converter, said torque splitting gear set when said first recited friction-drive-establishing device is engaged splitting input torque and establishing a power path separate from the power path through said converter, said torque combining gear set operating to combine the power through the paths to drive said output at a second reduction ratio, said converter having a torque absorption capacity which drags the powerplant speed to the lower level when said input torque is split to thereby reduce powerplant and transmission noise levels.

4. The transmission of claim 1, said torque multiplying means being a hydrodynamic torque converter having a pump and at least one turbine, said torque splitting means being a torque multiplying planetary unit, said unit including an input member and an output member and a control member, means operatively connecting said input member to said input means, and said first friction means being a friction-drive-establishing device operative to retard rotation of said control member thereby conditioning said unit to split input power.

5. The transmission of claim 4 wherein said torque splitting means is a planetary gear set having sun gear control and ring gear input and carrier output, said torque combining unit having ring gear input driven by the output of said torque splitting unit, and sun gear input for receiving positive torque from the turbine of said converter and carrier output connected to the output of said transmission.

6. The transmission of claim 4, and said torque combining means being a torque combining planetary unit having an input member operatively connected to the said output member of said torque splitting unit and a rotatable member operatively connected to said turbine of said torque converter and an output member connected to the transmission output, said torque combining unit being conditionable to rotate said turbine of said torque converter in a direction opposite to converter pump rotation in initial converter operation, said turbine exerting a positive torque on said rotatable member, said output of said torque splitting planetary unit exerting a positive torque on said input of said torque multiplying unit, said torque combining unit combining converter and mechanical torques to provide additional transmission torque multiplication.

7. The transmission of claim 6 wherein said third friction means is a one-way brake, selectively engageable means for connecting said one-way brake to ground thereby enabling said one-way brake to hold the one of said members of said torque combining unit for reaction, said torque combining unit then providing means to further multiply converter torque to drive the transmission output in a reduction ratio greater than the reduction ratio produced with the torque splitting unit operative to split transmission input torque.

8. The transmission of claim 7, wherein the largest reduction ratio of said transmission is established upon release of said first recited friction-drive-establishing device, said second friction means being a selectively engageable friction-drive-establishing device for connecting said input means to the transmission output and a planetary unit operatively connected to said torque combining planetary unit and said transmission output means and having a selectively engageable friction device for establishing a reverse drive.

9. The transmission of claim 7 in which said torque converter is a dual turbine torque converter, and further including a clutch selectively engageable to connect the second turbine of said torque converter to said output member of said torque combining unit, said torque combining unit combining the torques of both of said turbines for producing a first reduction ratio and further combining the torques of both of said turbines and additional mechanical torque from said torque splitting unit for producing a second reduction ratio.

10. In a transmission having an input and an output, a torque converter having a pump operatively connected to said input and having turbine output means, a torque splitting planetary gearset having an input member operatively connected to said transmission input, said gear set having a control member and an output member, a torque combining planetary gear set having a first member operatively connected to said output member of said torque splitting planetary gear set and having a second member operatively connected to said turbine means and having an output member drivingly connected to said transmission output, a first selectively engageable friction-drive-establishing device operatively connected to said first member of said torque combining gear set engageable to condition said torque combining gear set for torque multiplication and said transmission for a torque converter low range drive, a second selectively engageable friction-drive-establishing device operatively connected to said control member and engageable to permit said torque splitting gear set to split input torque and drive said first member of said torque combining gear set simultaneously with the drive of said second member of said torque combining gear set by said torque converter to provide an intermediate range torque converter and mechanical drive, and a third selectively engageable friction device operatively connected to said transmission input and said output member of said torque combining planetary gear set and engageable to permit said transmission input to directly drive said transmission output for a full mechanical direct drive ratio.

11. The transmission of claim 10 wherein said torque converter output means is formed by first and second turbines, torque transmitting means drivingly connecting one of said turbines to said second member of said torque combining gear set, torque transmitting means including a friction clutch selectively engageable for connecting said second turbine to said transmission output.

12. The transmission of claim 10 wherein said torque converter turbine output means is a single turbine, torque transmitting means directly and drivingly connecting said turbine to said second member of said torque combining gear set.

13. The transmission of claim 10 wherein said third friction device is a clutch having first friction means carried by said transmission input and second friction means carried by said output member of said torque combining planetary gear set which cooperates to provide a slow speed clutch.

References Cited
UNITED STATES PATENTS

| | | | |
|---|---|---|---|
| 2,162,785 | 6/1939 | Neracher et al. | 74—759 |
| 2,519,022 | 8/1950 | Burtnett | 74—688 |
| 2,572,007 | 10/1951 | Burtnett | 74—688 X |
| 3,009,369 | 11/1961 | Flinn | 74—677 X |
| 3,107,553 | 10/1963 | Tuck | 74—688 |
| 3,270,586 | 9/1966 | Tuck et al. | 74—688 X |

FRED C. MATTERN, Jr., *Primary Examiner.*

THOMAS C. PERRY, *Assistant Examiner.*

UNITED STATES PATENT OFFICE
CERTIFICATE OF CORRECTION

Patent No. 3,396,606                          August 13, 1968

Robert M. Tuck

It is certified that error appears in the above identified patent and that said Letters Patent are hereby corrected as shown below:

Column 1, line 71, "combining gear set" should read -- combining planetary gear set --. Column 8, line 2, "sad" should read -- said --.

Signed and sealed this 6th day of January 1970.

(SEAL)

Attest:

Edward M. Fletcher, Jr.
Attesting Officer

WILLIAM E. SCHUYLER, JR.
Commissioner of Patents